(12) United States Patent
Trinkel et al.

(10) Patent No.: US 8,750,518 B2
(45) Date of Patent: Jun. 10, 2014

(54) METHOD AND SYSTEM FOR ARCHIVING COMMUNICATION DATA BY MEANS OF DATA TRACING

(76) Inventors: Gabriele Trinkel, Kreuzau (DE); Marian Trinkel, Kreuzau (DE); Frank Dauβmann, Haβloch (DE); Ralf Maier, Neustadt (DE); Jakob Hoepelman, Renningen (DE)

( * ) Notice: Subject to any disclaimer, the term of this patent is extended or adjusted under 35 U.S.C. 154(b) by 1350 days.

(21) Appl. No.: 12/248,917

(22) Filed: Oct. 10, 2008

(65) Prior Publication Data
US 2009/0097658 A1  Apr. 16, 2009

(30) Foreign Application Priority Data
Oct. 10, 2007 (DE) .......................... 10 2007 048 518

(51) Int. Cl.
| | |
|---|---|
| *H04L 29/06* | (2006.01) |
| *H04L 9/08* | (2006.01) |
| *H04L 9/30* | (2006.01) |
| *H04L 12/24* | (2006.01) |
| *G06F 21/10* | (2013.01) |

(52) U.S. Cl.
CPC .. *H04L 9/08* (2013.01); *H04L 9/30* (2013.01); *H04L 41/12* (2013.01); *H04L 63/30* (2013.01); *H04L 63/0428* (2013.01); *H04L 9/083* (2013.01); *G06F 21/10* (2013.01); *Y10S 707/99931* (2013.01); *Y10S 707/99941* (2013.01)

USPC ................. 380/277; 707/999.001; 707/999.1; 707/E17.044

(58) Field of Classification Search
CPC ....... H04L 63/0428; H04L 9/08; H04L 41/12; H04L 63/30; H04L 9/083; H04L 9/30; G06F 21/10
USPC ........................................................ 380/277
See application file for complete search history.

(56) References Cited

U.S. PATENT DOCUMENTS

| | | | |
|---|---|---|---|
| 2006/0217881 A1* | 9/2006 | Pei et al. ........................ | 701/208 |
| 2008/0019514 A1* | 1/2008 | Stromberg et al. ............. | 380/46 |
| 2011/0288971 A1* | 11/2011 | Wang et al. ..................... | 705/30 |
| 2012/0066221 A1* | 3/2012 | Behzad et al. ................. | 707/736 |

OTHER PUBLICATIONS

Masahide Yuasa et al. "Information Retrieval System Using Location and Transportation by GPS traces as Search Criteria." IEEE Region 10 Conference [2011], pp. 221-225.*

* cited by examiner

*Primary Examiner* — Morshed Mehedi
*Assistant Examiner* — Narciso Victoria
(74) *Attorney, Agent, or Firm* — Gudrun E. Huckett (57) ABSTRACT

In a method for operating a computer system connected to a telecommunication network and provided with a data memory for storing communication data, a data trace is compiled from parameters selected from time, at least one position designation, and at least one content. A communication data set together with the data trace is stored as a data set that is retrievable by authorized persons.

18 Claims, 3 Drawing Sheets

METHOD AND SYSTEM FOR ARCHIVING COMMUNICATION DATA BY MEANS OF DATA TRACING

BACKGROUND OF THE INVENTION

The invention relates to a method and a system for operating a memory system that is connected to a telecommunications network, in particular, connected to a telephone network, an exchange, text messaging and voice messaging systems, which memory system stores and archives in a non-erasable way communication content, data, links and makes them accessible also to third parties. The storage of the content is realized by means of a data trace that is a combination of time, a position, and content. In this connection, the position or locality can be generated by means of communication identifiers. The content, for example, comprised of the communication identifier, can, in turn, also contain a data trace, for example, to the communication destination address. Also, the variable data trace can be used as a key for an encryption system.

In today's communication society and in business communications, there is the desire and necessity to generate movement profiles or to provide a movement/event log such as a driver's log as evidence. For this purpose, different methods for position determination and documentation are used. In case of position determination, preferably GPS (global positioning system) is employed. Furthermore, these GPS data or positional data are linked with communication data. Such methods and systems are used, as is well known, for mobile communication systems.

A disadvantage of the known methods and systems is however that a satellite-based system, for example, GPS, is employed but not all communication systems or mobile phones comprise an external GPS recognition system. Moreover, there is the disadvantage in connection with the known methods that the content is administered separately and in distributed form. Such problems can occur in the known systems and methods at any time.

SUMMARY OF THE INVENTION

It is an object of the present invention to provide a method that in a simple and inexpensive way makes available communication data and information data.
It is moreover the object of the present invention to provide a system for implementing the method.

In relation to the method this is achieved in that a set of communication data and/or communication content (in the context of the present invention, the term communication data set is meant to encompass any type of communication data and communication content addressed in this specification) is stored by means of a data trace that is combined of parameters of time, at least one position designation and/or at least one content.

In relation to the system this is achieved in that the inventive module is realized by a program (program code) that runs on at least one computer and/or a computer system connected to the network.

The principal idea of the present invention is that at least one data trace is archived (stored). In this connection, different data bases are linked and the generated data are combined to the content. Based on the determined data, further combinations and processing can be realized and added to the content, for example, positional determination derived from the communication address. In this connection, a data trace is comprised at least of the technical parameter of time, position, and content. The content can again be in the form of a data trace.

The trace or data trace is combined of at least one trace or partial trace that can be dependent e.g. on time, position, and content. The data trace is combined according to the invention of a compilation (+) of different parameters: at least one time information ($t_{time}$), position ($P_{position}$), and the content ($C_{content/transaction}$) representing the data trace as follows:

$$\text{trace} = t_{time} + P_{position} + C_{content/transaction}.$$

The content ($C_{content/transaction}$) can comprise another data trace:

$$C_{content/transaction} = t_{time} + P_{position} + C_{content/transaction}.$$

Each parameter can be determined by different techniques. At the same time, the entire data trace can be represented by one technical parameter and can set further trigger points, for example, in that from the data trace the information content is determined and is added to the content. The sum of the data trace parts, for example, from point or position A to the point or position B can also be interpreted and used as a driver's log or any other type of log. By means of the time parameter t=indefinite or t=10 years, the trace becomes interpretable as curriculum vitae. The trace can be described e.g. by its information content wherein in a special embodiment it can be used in an encryption system. The information content of the data trace ($I(N)_{trace}$) can be represented as follows in an exemplary fashion:

$$(I(N)_{trace}) = 1d(1/(-p*\text{Content})) = -1d(p*\text{Content}) \text{ or}$$

$$H_{trace} = \Sigma p_i \log_2 p_{i*Content}.$$

The trace can be used as an encryption system or key for an encryption system in connection with security-relevant products. The encryption system KS can be represented as follows:

$$KS = (AT, BT, S)$$

with AT, BT the number of all words derived from the alphabet and S a key derived from $$S_{(trace)} = S(t_{time} + P_{position} + C_{content/transaction}).$$

The parameter time is a unique parameter in the inventive method, also in combination with further features of the data trace. Since a certain local action, content, personalized content cannot happen at the same time, the time is an important parameter for the data trace. In this connection, a time stamp can be used and/or a time stamp that synchronizes the available different time systems in such a way that a sequential number, i.e., time ordinal (NR), is assigned. In this way, for example, for each data trace and/or communication address a specific communication time ordinal (NR) of the time (t) can be assigned; with t>0 for the control variable n greater than zero the following applies: NR(tn+1)<NR(tn+2)

In a special embodiment the time can be determined based on secondary systems, for example, navigation satellites, mobile radio systems. According to the invention, the function time can be derived from the satellite system and/or from the mobile radio system. For examples, a calibration can be carried out based on the communication time ordinal. In this connection, the external system provides the time t1 and another system the time t2 wherein t1>t2. The communication time ordinal (NR) of the time (t) in accordance with the invention are realized with t1>t2>0; for the control variable n greater zero the following applies: NR(tn+2)>NR(tn+1). In this connection, a preferred time can be selected: NR(t)= >t1>t2 or NR(t)=<t2<t1. In a special embodiment, time differences can be determined and taken into consideration and a corrected communication time difference can be added as a parameter to the trace. Also, the communication time ordinal can be used as a time stamp, in the context with other data sets, data traces and/or in the entire data inventory of the system according to the invention. Also, it is possible that the communication time ordinal and/or communication time difference can be utilized as a further sub parameter of the time in accordance with the invention. For example, a time stamp of the form date/time of day can be realized (Oct. 27, 2007 08:53:20) or date/time of day/communication number (Oct. 27, 2007 08:53:20 1234567). Further combinatorial possibilities are envisioned.

The parameter position can be determined by means of the global positioning system and the data can be added to the trace. For this purpose, the communication system must have GPS capability.

In a further embodiment, by means of the existing communication system the position can be determined. In this connection, by means of the communication address the communication system looks up where the system is located. For a fixed communication system (fixed line system), it can be determined, for example, based on the calling line identification (CLI) where the communication system is located since the calling line number is based on a fixed pattern: the area code and the individual subscriber number. For example, based on the area code 0202 in Germany it can be determined that the location or city is Wuppertal. Accordingly, the data can be retrieved from the communication system and transferred to the trace as an identifier which trace belongs to the communication address. This can also be realized by means of a matrix that is stored in a central and/or decentralized system and correlates, for example, the area code, the subscriber number and the geographic data. As an example, the area code 0202 is linked with the position Wuppertal, the subscriber number 0202-6986269 is linked with the position Wuppertal, street address Lönsstrasse 59. At the same time, the number 0202-6986269 linked with the position Wuppertal, Lönsstrasse 59, can be linked with CLI, HLR (home location register) of a mobile communication systems etc. as a fixed source, i.e., this means that this is the fictitious location and not the real one as the mobile system is able to move about. The special advantage is that different data are already contained in the data set and thus a fast access to the data and thus a reduction in computing time are provided.

For a mobile system, by means of the radio cell or by linking several such radio cells the position of the communication system can be determined. In this connection, the HLR (home location register) that provides an unequivoval communication address and the radio cells where the HLR is located are tracked.

Content refers in this connection to all those parameters, information, messages, that can be recorded and stored by means of the technical system as well as information and data that, for example, are converted mathematically and are subsequently represented as technical parameters. For example, content is understood in the context of the present invention inter alia as communication addresses, speech data, image data, condition data as well as the information content, the probability of parts of the content.

Transaction refers in this context inter alia to a partial quantity of the content. In this context, the transaction can also be outside of telecommunication, for example, a payment process at a digital cash register by means of a credit card, a digital receipt at a cash register of a grocery store, cash withdrawal at an automatic teller machine, electronic or digital telephonic inquiries at a government office.

The term modal data is to be understood in this context as containing modal parameters and/or a mixture of data, for example, speech data, image data, control signals. In this connection, the mobile data can be designed such that, for example, speech data are changed to image data and image data into speech data. For example, this relates to a "spoken image" where the image data, for example, image pixel, are converted into acoustic signals (noise) and vice versa.

The term multi-modal mobile storage is to be understood in this context as an inhomogeneous storage such that, for example, the speech data and image data are saved together and/or the image data and speech data are converted into acoustic signals and these acoustic signals are saved as such and/or as speech data, for example, in MP3, WAV formats.

The term medium change is to be understood inter alia such that a change from one medium—speech—into another medium—image—is done or vice versa. This change of medium is particularly advantageous for security aspects.

The communication address (communication identifier) is to be understood in this context as an identification in the form of characteristic communication data, inter alia, comprised of one or more classes. The individual classes are technical features, for example:

1) subscriber identification, for example, client ID number, PAN (personal address number), telephone number, billing account number, personal ID card number, TIN (tax identification number), 11-digit tax number;
2) communication identifier, for example, calling line identification (CLI), HLR (home location register), IP address (Internet protocol), dial-up number, telephone number, telecommunication card number;
3) device identifier, for example, IMEI (international mobile equipment identity), definition IMEI (international mobile equipment identity), in GSM system the number that identifies a device unequivocally and that is always checked upon authorization; IMEI are located on various lists (white list; grey list; black list in the equipment identification register (EIR)); IMSI (international mobile subscriber identity) specifies a number comprising up to 15 digits that identifies a caller on a mobile radio system (MS mobile subscriber) unequivocally and is comprised of MCC=mobile country code, MNC=mobile network code, MS-IN=mobile subscriber identity number (fixedly assigned to a communication system, based on ITU E.212, stored in SIM (subscriber identity module), and is transmitted every time the system is logged in and serves for identification of the data sets in HLR (home location register), AUC (authentication center), VLR (visitor location register);
4. transaction identifier for the transaction, for example, transaction identifier for the transaction of the communication call ID;
5. biometric identification, for example, fingerprint, voice print, iris.

In a special embodiment by utilizing the IP address (IP=Internet protocol), this IP address provides information in regard to how the system is connected to the Internet. This is so because each IP address in the Internet is assigned precisely to one "owner". When a computer is active that is connected fixedly to the Internet (for example, a computing center of a university or of a large business), the IP address identifies precisely this computer.

When the system dials into the Internet by telephone, DSL (digital subscriber line), cable modem or by other access paths, the IP address identifies the computer to its provider by means of which it is accessing the Internet. This is so because it is not the computer but the access provider that is fixedly connected to the Internet. Typically, for each dial-in a different IP address is provided. The provider has a plurality of computers each having their own address. In particular this holds true of course for large providers such as the German provider T-Online or the U.S. provider AOL. At the time of dial-in, the computer is connected by random assignment to an access computer. This means that the IP address is not permanently assigned to a computer but only for the duration of the current Internet session. Only the provider knows at which point in time which client has which IP address but the server addressed by the dial-in computer has no such knowledge. However, based on the IP address it can still be recognized which provider the system is using for Internet access. It can also be informative which longhand name is assigned to the IP address. The IP address 66.249.66.12 has as a longhand name the following designation: mtte-62-456-66-12.googlebot.com. In case of some providers, this name provides information in regard to the location of the dial-in node or in regard to the employed access technology. By means of appropriate register services it is possible to find out to whom the respective IP address has been assigned.

In this context, a communication system is understood, inter alia, to be e.g. base transceiver station of a provider, the exchange of a fixed line provider. Also, the term is meant to include a communication system of a client. In this connection, the communication system can be, for example, a mobile or a fixed line communication system, a fixed line hookup or Internet hookup. The communication system supports the communication between client and client, human and machine, machine and machine, or machine and human.

In a special embodiment, the parameter position can be determined, for example, by means of a visual image, image sequence, video, photo transmitted to the communication system. The communication system can generate this image automatically or when triggered by a client, for example, an image of an object with special features, a cathedral, a train station, starry skies, position of the sun. In a further embodiment, barcodes of vending machines, telephone booths, automated teller machines, emergency telephones can be determined. Triggering can be done by the client purposely in that the photo is shot. In case of a temporary triggering, the communication system can cause, for example, in temporal intervals, at sudden movements, that an image or image sequence is taken. At the same time, by means of other trigger systems, for example, RFID, WLAN, and near-field reception, an image and/or image sequence can be triggered. An evaluation system, that is e.g. a central system or a decentralized system, determines based on the received photos or speech the possible position of the communication system and sends this information back to the system for compiling the data trace and/or the communication system. In this connection, the evaluation system also monitors whether a real image or sound recording has been received or whether a fake has been received that only pretends to be at the location in question.

In a further special embodiment, based on the content, the transaction, the data quantity and the position can be determined, for example, the location can be determined based on the image and/or based on the sound alone. For example, when a photo of the "Oktoberfest" in Munich is taken and the sound is not primarily "Bavarian", i.e. a German dialect, the system can deduce that the location is outside of Munich and, in fact, the location is a local national "Oktoberfest", for example, in Wuppertal, Germany, or Beijing, China, based on the spoken regional dialects or accents.

The parameter content is comprised according to the invention inter alia of a set of parameters and/or data. For example, the parameter can be the content, the communication identifier (for example, 0202-6986296, C communication identifier, C={C/c ∈ HLR, IP, CLI} communication address of a communication system (e.g. device identifier, mobile system, fixed line system, K communication system, K={K/k ∈ handy, screen, fixed line network} and/or links (for example, IP addresses www. . . . , link L={L/l ∈ www. . . . }. At the same time, the content can also contain destinations, addresses (for example, who has used the system and/or where has the system transmitted to—this communication system, this communication address, this link is known). Also, the content is a subset of transactions (T) (for example, content and quantity). In this context, there are different transactions in the form of, for example, text, images, sound (for example with A —type of transaction A={A/a<message, image, text speech, control signal>} wherein the message=0000 0000 0000 can be the card number, content, destination, with M—content set (e.g., M=in bit={0.1}, M=in bit/sec., M=pixels), color scale, and/or S—information set S=k, P with P=probability.

As an example, each data trace and/or in sum a set of data traces, for example, per time unit and/or per hookup and/or per link www. . . . has a probability. This probability can have different characteristics, for example, the probability of possible risks to third parties, the probability of a call for help. These temporary probability has the advantage that in case of a change, for example, according to time, according to content, a different weighting can be done and/or even simulation of probabilities can be performed before a possible event has actually happened. The parameter content can also be a communication address, for example, a calling line identification (CLI), home location register (HLR), IP address. In this context, for example, this can be a destination CLI/HLR/IP address or one's own address. In this connection based on the sum of the addresses a destination/user profile can be recognized and processed; also, it is apparent who knows who.

In a special embodiment, the data trace can also be represented by a technical parameter and can set further trigger points in that, based on the data trace, the information content is determined. This is represented by:

$$I(N)_{trace} = 1d(1/(-p*\text{Content})) = -1d(p*\text{Content}) \text{ and}$$
$$H_{trace} = \Sigma p_i \log_2 p_{i*Content}.$$

This functional value can be determined, classified and used as a technical trigger point. In this context, the data trace can be expanded by this trigger point. This has, for example, the advantage that an encryption key can be developed that changes over time.

In a special embodiment, the storage and archiving of the data trace can be carried out in multi-modal fashion, for example, based on audio data and/or visual data. In this connection, the data or bit sequence is converted into and/or represented in acoustic/visual form and saved. This has, for example, the advantage that an encryption key can be developed that e.g. changes over time and/or with a positional change and is present in acoustic/visual form and/or is realized for saving and/or for security of the data by a media change, especially when the key is in acoustic form. In this connection, a media change, a change of the purely binary data into an acoustic sequence and/or into a visual sequence of signals on a memory medium is done. In this context, for example the acoustic data can be used again as a key, for example, recursively. In this connection, the communication data can be encrypted with the data trace. In this context, the system can select a special trace and can use it as a key and/or only parts of a trace. At the same time, a conversion of the trace can be performed by modal storage and/or a media break (discontinuity) and can be used in digitalized form as a key for the encryption system. This has the advantage that the key changes over time and/or location and/or content; this is to be understood also in this context of the activity that also changes constantly. This constant change is used according to the invention for a constant change of the key for the encryption system so that, for third parties that do not know the trace, the key cannot be retraced or can be retraced only with great difficulty. In this way, a safe storing and archiving of the data can be realized and/or they can be used as a key for a further system.

An encryption system is understood in this context also as a system for generating and describing a document or a memory content, or for introducing into a data stream a watermark, a digital watermark, a digital signature, copy protection.

As an example, the transfer of content with a watermark can be realized wherein the watermark is based on the trace used as a key. In this way, at any time the author or the requester, in case of transfer of information data to unauthorized third parties, can be identified. In this connection, the watermark can change depending on time and/or location and/or content in that different traces depending on time and/or location and/or content are used. Accordingly, no static watermark is present but a quasi fixed temporary watermark, i.e., that is traceable by authorized third parties and static but temporary depending on the trace.

Upon retrieval from the archive or storage, subsequently the trace, for example, the communication address and/or the content, e.g. the voice profile, is used as a decryption key. Also, archiving and storing can be made accessible for third parties; this can be done with time delay, relative to a position or location, or online.

In a further embodiment, before and after archiving the voice parameters can be registered and/or can be compared to the information requester. When the parameters coincide with those that are archived, it is to be assumed that the requestor seeking information is a contracting party or participant of the archive. As a result of personal rights related to voice, any participant represented by voice is also a contracting party whose voice profile is registered together with his/her communication address.

In a special embodiment the content can contain the communication address of the communication partner in such a way that e.g. in case of a telecommunication conference the determined communication addresses are added to the content. Likewise, the traces existing of the conference addresses and communication addresses at a certain point in time, position, or content are added. Accordingly, the system contains a communication profile.

In a further embodiment, the trace can serve as a type of electronic signature as proof that a conversation has taken place and/or, after the content of the conversation has been converted from speech into written electronic form, can be for electronically signing the converted data.

In contrast to conventional methods, the method according to the invention has the advantage that different solutions between communication and mobility can be combined to a convergent solution with its generally known technical advantages. Furthermore, simple operation and high security with respect to data falsification by third parties are provided. Moreover, security-relevant solutions in regard to encryption, voluntary monitoring, for example, automated driver's logs, payment of toll fees, etc. are possible. In contrast to conventional methods, the inventive method has the advantage that different security mechanisms are employed in order to obtain a higher overall level of security. Primarily, there is a hardware safety aspect in that in the trace only a unique communication hookup or access must be present that also was responsible (at least partly) for ordering data storage, for example, a mobile phone identification or the location of a fixed line hookup or access.

When a conference call with several clients is performed, each of the participating clients is a commissioning or contracting client. If one of the clients does not agree to recording and archiving of the trace, this client will be eliminated from the content and voice recording automatically based on the voice profile, individual network identification and/or voice parameters.

In a special embodiment, the trace can contain information data and voice data also in other electronic form aside form voice itself. For example, the speech can be converted by a computer program into written form, for the purpose of written minutes or for additional electronic processing, for example, for translation into another language.

A further advantage is the simple operation with high security in regard to falsification and thus cost reduction by multi-use of systems on several product groups in a convergent solution in that e.g. a driver's log is recorded manually or is kept at an extremely high technological standard. Also, the data generated and saved in the communication system or communication network have added value in particular in regard to security-relevant products.

In the following, special embodiments of the invention will be explained; as an example, a driver's log is being used. The mobile client has a communication system, for example, a mobile phone. The client wants to drive from location A to location B. Before beginning the journey, the client enters into the communication system a control signal (e.g. SMS—text message) for activation (or reactivation) for detecting the position (e.g. radio cell). The client in this way authorizes the provider to determine the client's coordinates and to evaluate them. Subsequently, the active communication connection is interrupted and the system remains in standby as usual, i.e., the communication is terminated and the device continues to search active radio cells or vice versa. The communication system of the provider records the standby data and follows as a result of the release the data trace. As needed, the database result and the information provided by the client are made available.

In this way, an automated city tour or sightseeing tour is made possible also by means of the mobile communications system. For example, the client with his communications system is traveling by train and can listen to music. There are several channels provided in the train. The trains travel on fixed routes and at more or less predetermined speed. The control center knows at any time by radio contact where the train is traveling. One of the channels provided in the train could be an information channel. An announcer will explain knowledgeable information in regard to the area through which the train travels. This information is in the form of short dialogs and explanations (between two to five minutes) that can be listened to when reaching a location where the information is appropriate (legends, events, historical facts, etc., possibly also commercials in regard to activities in the area, boating trips, hiking trails, leisure activities, amusement parks etc.). When no such information is currently available, this channel will play music until the next point of interest is reached and the announcer is superimposed on the music. Accordingly, the travelers traveling for example from Frankfurt, Germany, to Berlin, Germany, will receive informative facts in regard to the areas through which they travels. This can be a business model: educational journey by train—learn more about your country. This includes the following steps:

1) The train reports to the control center where it is traveling currently.
2) The control center determines the geographic data and sends the signal for starting the voice application.
3) The signal receiver within the train transmits the signal to the voice application.
4) Before and after voice application an endless tape with music is being played.

The train conductor must only start or reset this application before the train starts on its journey.

In a further embodiment the trace can be used for city tours and sightseeing tours by mobile phone. For example, a person is standing in front of a famous church or cathedral in Munich, Germany, and calls by mobile phone and receives for approximately five minutes knowledgeable information in regard to the building. In this connection, the signal transducer and the sender/receiver must not be spatially separated. This is done in an exemplary fashion as follows:
1) User calls by mobile phone.
2) Receiver and/or provider system determine the geographic location of the mobile communication system and transmits the geographic data.
3) The evaluation system retrieves in accordance with the data a voice file and this voice file is played to the caller.

The principal idea of the present invention is that the client by means of telecommunication system will send a control signal (target data re locality, reason) so that, in this way, the radio cells are always determined and stored and the input of the client is then compared to the profile of the communication movement data and content; output, recording, archiving, or storing of a telecommunication-supported driver's log and information is thus realized.

BRIEF DESCRIPTION OF THE DRAWING

In the drawings preferred embodiments are illustrated but the invention is not limited to the illustrated arrangements and implementations.

DESCRIPTION OF THE PREFERRED EMBODIMENTS

Figure 1:
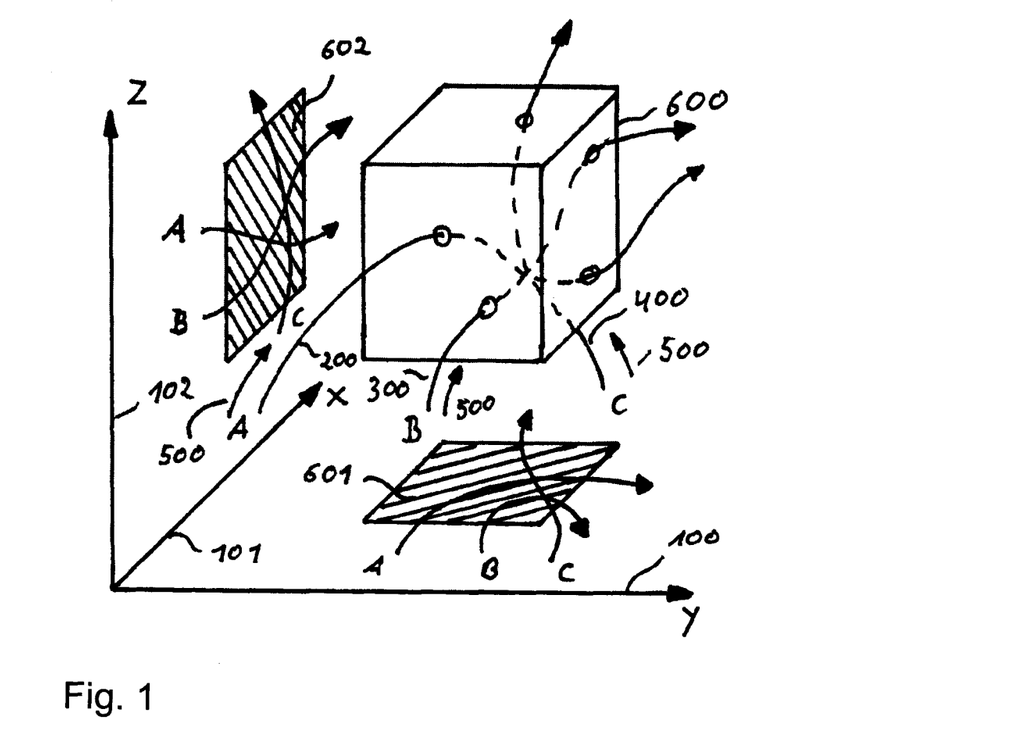
FIG. 1 illustrates the method of providing a data trace.

FIG. 1 illustrates the basic principle of the trace according to the invention. In this context, the coordinate system 100, 101, 102 can be a geographic position, for example, including elevation 102. Also, one of the coordinate axes (102) can be the probability of the content. The client A 200 moves through space, here within the coordinate system 100, 101, 102 with time t 500 as a variable. Also, the client B 300 and the client C 400 also leave a trace. In the prior art, a movement space or movement profile 601 is generated in regard to locality of the clients A, B, C. According to the invention, within a searching space 600 all traces of the clients 200, 300, 400 can be localized with additional information, for example, the content space 602. Also, overlap, meetings, and approaches can be determined according to the invention, not only with regard to the position but also in regard to same or similar information content, content, similar patterns etc. In a special embodiment, on the coordinate z 102 also the probability or information content to the content, can be plotted, for example, in the content space 602, here in a combination with the axis x 101 and the time 500. On the coordinate z 102, for example, the probability in regard to a call for help of the clients A, B, C can be recorded at the time at the locations. Based on the defined searching space for the probability in regard to position, location, and time, it can be seen, for example, that the client C 400 penetrates the searching space and that there is a high probability for a call for help.

Figure 2:
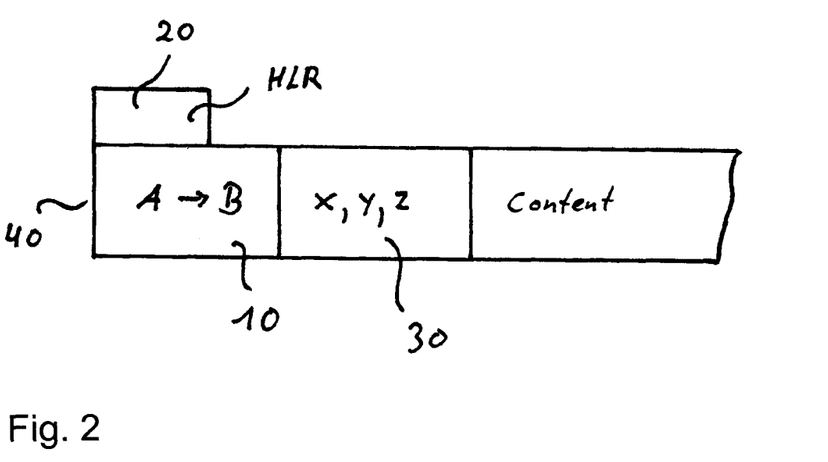
FIG. 2 shows a possible data set of the method.

FIG. 2 shows in an exemplary fashion the basic principle in accordance with the present invention of the combination of a trace 40. It is combined of the own communication address 20, the communication address 10, here client A calls client B, and the locality or geographic position 30 with position designations such as longitude x, latitude y, and elevation z, and the content. The content can be the position, the voice, an image or a further trace that as, an example, is in a defined proximity to the own trace. The data set structure can be as follows:

<HLR, SMS data, radio cell(s1–)>or
<HLR, SMS data, radio cell(s1–), time window, duration>.

Figure 3:
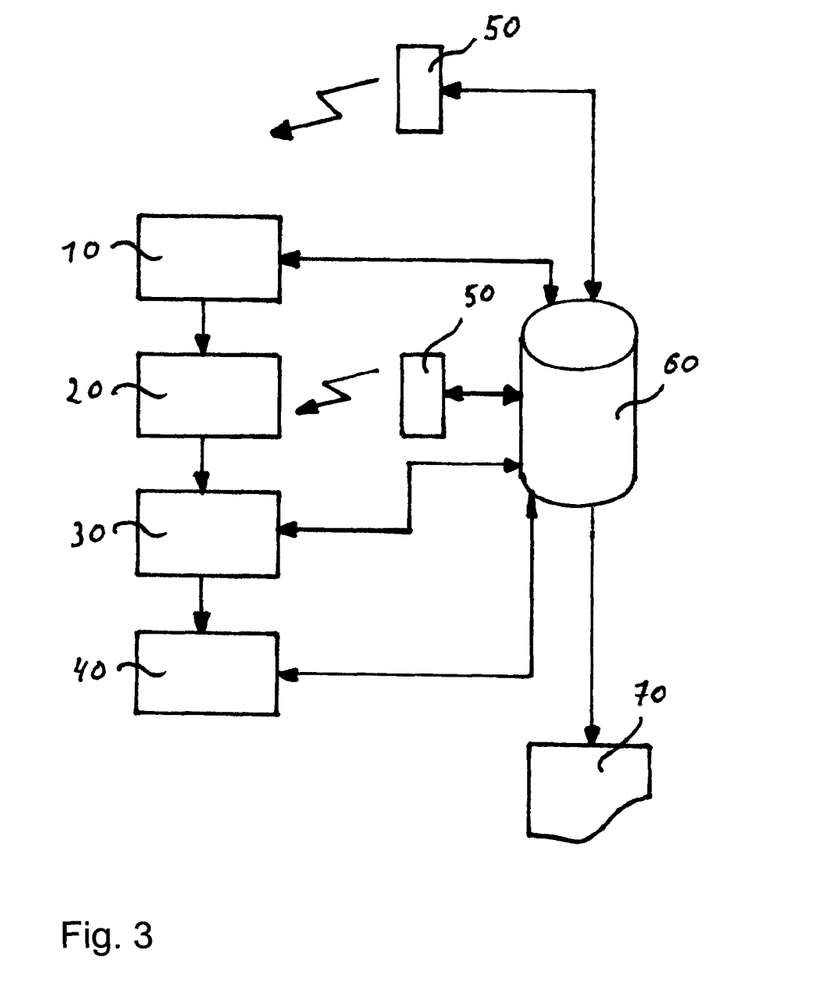
FIG. 3 is a block diagram of the principle of a typical architecture.

FIG. 3 shows the basic principle in the form of a block diagram of typical application architecture.

The initial and basic situation for a drivers log could be as follows. A client wants to travel, for example, by car from the position A to the position B. For this purpose, the client enters via his communication system a SMS text message for starting the application 10, including the departure location data and destination data, in this case for a driver's log the names of the cities or geographic coordinates.

Step 1: The client activates his working day, for example, by dialing-in or calling a communication address or service; this triggers or activates the service 10; when the actual departure location is unknown, the application determines this by itself—30 (the system recognizes the actual origin location, for example, by means of GPS, radio cell, fixed line network), and attaches the SMS message with the departure location A and the destination B.

Step 2: The communication addresses or data, HRL, or radio cell are determined—20 in the radio fields; subsequently, the communication system or mobile communication system passes through various radio cells 50.

Step 3: The position is determined (30) based on the radio cells. The radio cells are saved in the database 60 and linked with further parameters such as the SMS message, communication address (40).

Step 4: The data SMS message, destination, reason and radio cell are combined, as detected by the radio fields. Different databases can be used, for example, database 1 provides HLR, database 2 provides the radio cells for the HLR, database 3 is a service database, linking of the data and storage is done in the database 60 with a subsequent LOOP from module 40 to module 20. The loop can be directly linked to the module or this can be done by means of the database 60 such that the LOOP end module, here module 40, repeatedly queries the database whether new data sets are present, for example, from the module 20 by means of the radio network 50. When new data have been received, the module 40 transfers control to the module 20. Additionally, a control and compensation of the route of the SMS message with the actual destination route can be performed. At the destination, after overtime or when triggered, a compensation is carried out and the route (radio cell route) is registered and documented in a non-erasable way in the database 60 or in a driver's log 70.

Step 5 End of processing.

Figure 4:
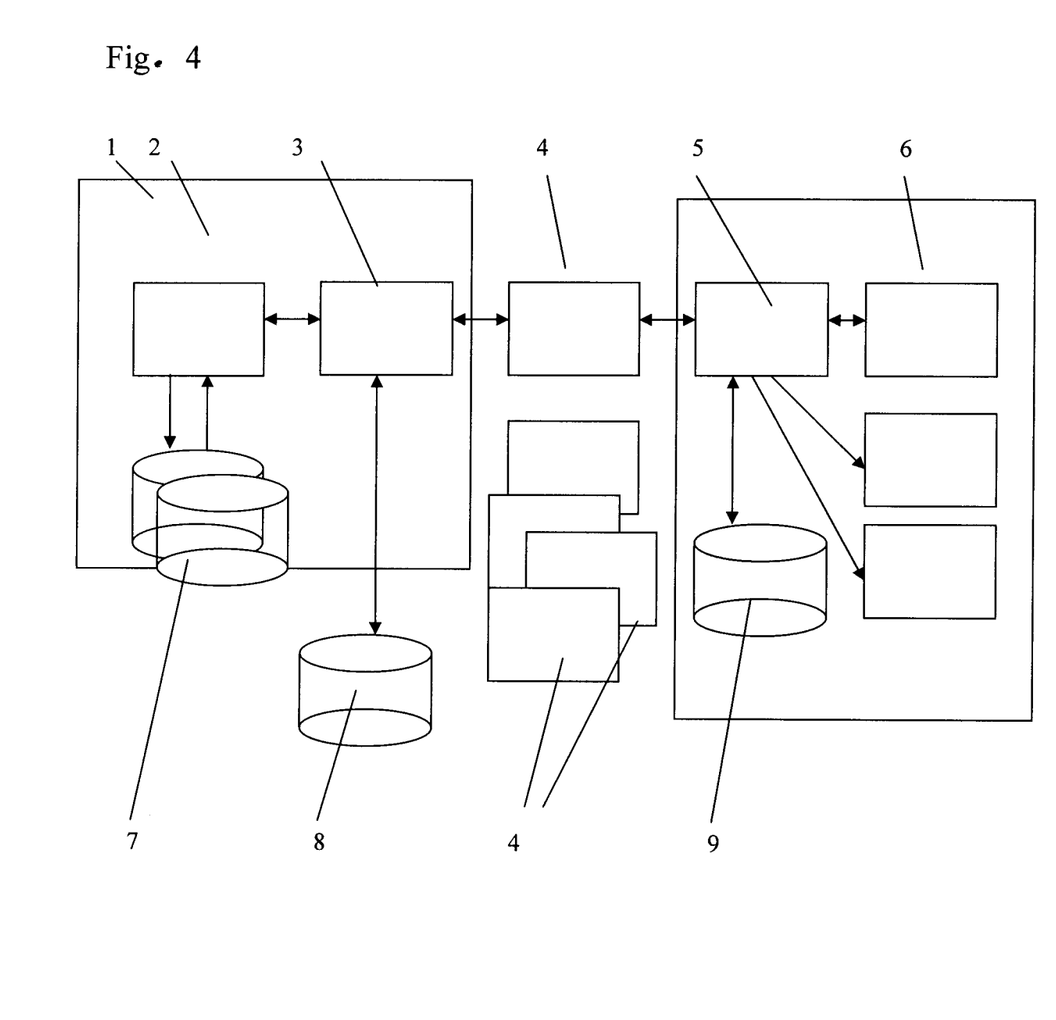
FIG. 4 shows a typical architecture.

FIG. 4 shows a typical architecture for producing a trace. The mobile provider 1 has a computer system with computer-readable memory and data processing system and is the data administrator 2 of the communication addresses that are saved in the database 7; the application (program) 3 is within the provider system 1 and writes the communication data of the trace into the database 8. The client with his communication system 5 has various input and output systems available, for example, SMS (text messaging), text, image, sound, and passes through different communication networks 4 depending on the position and time. When doing so, data 9 are sent, for example, by the communication system of the client to the provider 1 and saved in the database 8.

LIST OF REFERENCE NUMERALS

1 mobile provider, for example, fixed line provided, Internet provider, communications provider
2 database manager, for example, HLR, IMxx
3 application, for example, SMS log, driver's log, archiving
4 radio cell, radio cells, for example, A at the location A, B at the location B, C at the location C. D at . . .
5 communication system of the client, for example, mobile phone, PDA, telephone
6 input and output systems, for example, SMS, text, image, sound, camera, microphone, sensor
7 provider database, for example, database with a HLR and linking to the residence location
8 database with content, for example, database with information in regard to the radio cells, locality
9 database of the client, for example, information cache, billing
10 input, trigger, for example, INPUT A−>B
20 communication address, for example, HLR, IP address, CLI, MEI, device identifier
30 parameter determination, for example, geographic position, or the probability $(x, y)f_{HLR}$
40 trace, for example with position, content, x, y, B
50 telecommunication network, for example, radio tower/s, radio cell, fixed line network, Internet
60 database, for example, provider database, content database, communication address database
70 output device, for example, screen, paper (printer), driver's log
100 geographic data (y), for example, longitude
101 geographic data (x), for example, latitude
102 geographic data (z), for example, elevation, probability, content
200 client A, for example at the time t, at the location x,y, information, content z
300 client B, for example, at the time t, at the location x,y, information, content z
400 client C, for example, at the time t, at the location x,y, information, content z
500 time t—time axis
600 trace searching space, for example, in the space x, y, z, probability space, information space
601 movement profile, searching space, for example, longitude, latitude
600 searching space for probability, information content, content The automated service in accordance with the invention can be incorporated by telecommunications providers and providers of conference platforms in their product and performance spectrum, for example, because of its simple operation. Furthermore, security applications are possible by means of security-determining processes. Moreover, business applications, for example, in the field of tourism or for collecting toll fees are possible, in particular without satellites. The invention provides an expansion of the product utility of mobile communications.

The specification incorporates by reference the entire disclosure of German priority document 10 2007 048 518.4 having a filing date of Oct. 10, 2007.

While specific embodiments of the invention have been shown and described in detail to illustrate the inventive principles, it will be understood that the invention may be embodied otherwise without departing from such principles.

What is claimed is:

1. A method for operating a computer system connected to a telecommunication network and comprising a data memory for storing communication data, said method comprising the steps of:
compiling a data trace from parameters selected from at least one content and at least one parameter selected from time and at least one position designation;
generating the at least one content from a communication identifier and communication content;
storing as stored data a communication data set together with said data trace;
encrypting at least one of the communication data set and the data trace with an encryption system by using at least a part of, or the entire, data trace as an encryption key of the encryption system;
generating the encryption key from a probability of the data trace; and
constantly changing the encryption key.

2. The method according to claim 1, further comprising the steps of determining the at least one position designation by a position-determining system having a system time, wherein the system time is used as the time for the data trace, and using the at least one position designation additionally in generating the encryption key.

3. The method according to claim 1, further comprising the step of determining the time based on time ordinals in that a definite calibrated time is generated from several different time systems and generating a communication time ordinal that is used additionally in generating the encryption key.

4. The method according to claim 1, further comprising the steps of determining the at least one position designation based on a communication system and using the at least one position designation additionally in generating the encryption key.

5. The method according to claim 1, further comprising the steps of determining the at least one position designation based on at least one communication identifier and using the at least one position designation additionally in generating the encryption key.

6. The method according to claim 1, further comprising the steps of determining the at least one position designation based on characteristic communication data or a communication address and using the at least one position designation additionally in generating the encryption key.

7. The method according to claim 1, wherein the at least one content further comprises at least one transaction.

8. The method according to claim 7, wherein the at least one transaction is comprised of at least one data trace.

9. The method according to claim 1, further comprising the steps of generating the at least one content from at least one transaction.

10. The method according to claim 1, wherein a documentation or a log is generated.

11. The method according to claim 1, wherein the data trace is saved as a signal form selected from an acoustic signal form, a visual signal form, and a modal data form and wherein the signal form is used additionally in generating the encryption key.

12. The method according to claim 1, wherein the encryption system is a system for generating a watermark, a digital signature, or a copy protection.

13. The method according to claim 1, wherein said data trace is saved as a function of at least one of the time, the at least one position designation, and the probability of the data trace.

14. The method according to claim 1, further comprising the step of retrieving the stored data online.

15. The method according to claim 1, wherein in the step of generating the encryption key, an information content of the at least one content is additionally used in generating the encryption key.

16. The method according to claim 1, wherein in the step of generating the encryption key, audio data of the at least one content are converted into a converted image data set, or image data of the at least one content are converted into a converted audio data set, and wherein the converted image data set or the converted audio data set is additionally used in generating the encryption key.

17. A computer system of a telecommunication network, wherein the computer system comprises a data memory for storing communication data and further comprises at least one data processing system and a computer-readable memory coupled to the at least one data processing system, wherein the computer-readable memory contains program code that, when executed, implements a method comprising the steps of:

compiling a data trace from parameters selected from at least one content and at least one parameter selected from time and at least one position designation;

generating the at least one content from a communication identifier and communication content;

storing as stored data a communication data set together with said data trace;

encrypting at least one of the communication data set and the data trace with an encryption system by using at least a part of, or the entire, data trace as an encryption key of the encryption system;

generating the encryption key from a probability of the data trace; and constantly changing the encryption key.

18. A computer program product stored on a computer-readable memory for providing a program code for:

compiling a data trace from parameters selected from at least one content and at least one parameter selected from time and at least one position designation;

generating the at least one content from a communication identifier and communication content;

storing as stored data a communication data set together with said data trace;

encrypting at least one of the communication data set and the data trace with an encryption system by using at least a part of, or the entire, data trace as an encryption key of the encryption system;

generating the encryption key from a probability of the data trace; and constantly changing the encryption key.

* * * * *